US009674105B2

(12) United States Patent
Groover et al.

(10) Patent No.: US 9,674,105 B2
(45) Date of Patent: Jun. 6, 2017

(54) APPLYING A PLATFORM CODE LEVEL UPDATE TO AN OPERATIONAL NODE

(71) Applicant: International Business Machines Corporation, Armonk, NY (US)

(72) Inventors: Michael P. Groover, Vail, AZ (US); Robin Han, Lincoln, CA (US); Yan Su, Zhejiang (CN); Wei Tang, Shanghai (CN); Ming Z. Zhao, Shanghai (CN); Yi Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 13/922,190

(22) Filed: Jun. 19, 2013

(65) Prior Publication Data
US 2014/0379919 A1 Dec. 25, 2014

(51) Int. Cl.
*G06F 15/16* (2006.01)
*H04L 12/911* (2013.01)
*G06F 9/445* (2006.01)
*G06F 9/50* (2006.01)

(52) U.S. Cl.
CPC ............... *H04L 47/70* (2013.01); *G06F 8/67* (2013.01); *G06F 9/5077* (2013.01)

(58) Field of Classification Search
CPC ........... H04L 47/70; G06F 8/67; G06F 9/5077
See application file for complete search history.

(56) References Cited

U.S. PATENT DOCUMENTS

| 6,698,017 B1 * | 2/2004 | Adamovits | G06F 8/67 717/168 |
| 6,775,672 B2 * | 8/2004 | Mahalingam | G06F 17/30079 |
| 7,293,944 B2 * | 11/2007 | Lui | B23B 31/02 279/147 |
| 7,356,679 B1 * | 4/2008 | Le | G06F 17/30067 707/E17.01 |
| 7,415,591 B1 * | 8/2008 | Todd | G06F 3/0614 711/165 |
| 7,627,746 B1 | 12/2009 | Pulleyn et al. | |

(Continued)

*Primary Examiner* — Moustafa M Meky
*Assistant Examiner* — Kidest Mendaye
(74) *Attorney, Agent, or Firm* — David W. Victor; Konrad Raynes Davda & Victor LLP (57) ABSTRACT

Provided are a computer program product, system, and method for applying a platform code level update to update a source partition in a computing system. Computational resources in the computing system are allocated to a destination partition. A code load is applied to the destination partition to implement an updated platform code level comprising an update to the platform code level on the source partition while the source partition is operational and processing computing requests. Submission of new transactions to the source partition is blocked in response to applying the code load to the destination partition. An operational environment and system state at the source partition are migrated to the destination partition in response to blocking submission of new transactions to the source partition. Transactions are directed to the destination partition intended for the source partition in response to migrating the operational environment and system state to the destination partition.

20 Claims, 5 Drawing Sheets

(56) References Cited

U.S. PATENT DOCUMENTS

| | | |
|---|---|---|
| 7,783,921 B2 | 8/2010 | Goldberg et al. |
| 8,131,891 B2 | 3/2012 | Boutcher et al. |
| 8,171,236 B2 | 5/2012 | Jacobs et al. |
| 2007/0204265 A1* | 8/2007 | Oshins ................. G06F 9/4856 718/1 |
| 2008/0178191 A1* | 7/2008 | Boutcher ............. G06F 9/5077 718/104 |
| 2008/0189432 A1* | 8/2008 | Abali ................... G06F 9/4856 709/238 |
| 2009/0037680 A1* | 2/2009 | Colbert ................ G06F 3/0617 711/162 |
| 2009/0182970 A1* | 7/2009 | Battista ................ G06F 9/5077 711/173 |
| 2011/0125979 A1* | 5/2011 | Kancharla ........... G06F 9/5077 711/162 |
| 2011/0302577 A1* | 12/2011 | Reuther .............. G06F 9/45558 718/1 |
| 2012/0041933 A1* | 2/2012 | Driesen ................ G06F 17/303 707/702 |
| 2012/0102156 A1* | 4/2012 | Kang et al. .................... 709/219 |
| 2012/0120153 A1* | 5/2012 | Kang ..................... B41J 2/1433 347/47 |
| 2012/0151477 A1* | 6/2012 | Sinha ................. G06F 9/45558 718/1 |
| 2012/0198076 A1 | 8/2012 | Kancharia et al. |
| 2012/0303912 A1* | 11/2012 | Calder ................. G06F 3/0623 711/162 |
| 2014/0129521 A1* | 5/2014 | Marsden ................ H04W 4/02 707/623 |

* cited by examiner

APPLYING A PLATFORM CODE LEVEL UPDATE TO AN OPERATIONAL NODE

BACKGROUND OF THE INVENTION

1. Field of the Invention

The present invention relates to a computer program product, system, and method for applying a platform code level update to an operational node.

2. Description of the Related Art

Current data storage facilities such as storage servers, subsystems and components often require firmware updates. The process is commonly referred to as code load or code update. During a code update of one of multiple storage subsystems in a storage facility having redundant storage subsystems, one or more of the subsystems are taken offline and their operation disrupted while their code is updated to a new level.

However, with a part of the subsystem disrupted, storage facility performance declines for the duration of the subsystem code update. Also system redundancy level is reduced, in certain scenarios, creating a "single point of failure" for the duration of the subsystem code update. Furthermore, if a problem occurs during the subsystem update, that subsystem remains inoperable, leaving the storage facility with less resource and a lower redundancy level.

SUMMARY

Provided are a computer program product, system, and method for applying a platform code level update to update a source partition in a computing system. Computational resources in the computing system are allocated to a destination partition. A code load is applied to the destination partition to implement an updated platform code level comprising an update to the platform code level on the source partition while the source partition is operational and processing computing requests. Submission of new transactions to the source partition is blocked in response to applying the code load to the destination partition. An operational environment and system state at the source partition are migrated to the destination partition in response to blocking submission of new transactions to the source partition. Transactions are directed to the destination partition intended for the source partition in response to migrating the operational environment and system state to the destination partition.

DETAILED DESCRIPTION

Described embodiments provide techniques for updating a platform code level in a storage partition in one or more storage nodes by creating a destination storage partition matching the resources, such as processor, memory, attached storage and networking resources, at the source storage partition having the platform code to update. In this way, the platform code update is applied to the destination storage partition while the main source storage partition remains active and servicing I/O requests in a storage environment. After the destination storage partition is upgraded to the desired or most recent platform code level, transactions at the current active source storage partition are temporarily halted while the operational state of the source storage partition is copied over to the destination storage partition. Once the destination storage partition resources and state match that of the source storage partition, the destination storage partition is then available to handle transactions for the storage. In this way, the time during which storage access is unavailable for a code upload is minimized to the time to migrate the system state of the source storage partition to the new destination storage partition having the desired platform code level. The migration involves the transfer of the operational environment, including processor state, memory contents, attached device states, and connected sockets and users while the source and destination partitions are active, otherwise referred to as a live migration.

In storage environments having redundant storage partitions, the redundancy is maintained for a maximum amount of time and only temporarily lost during the time the system state settings are migrated from the source storage partition to the new destination storage partition, which can occur relatively quickly.

Figure 1:
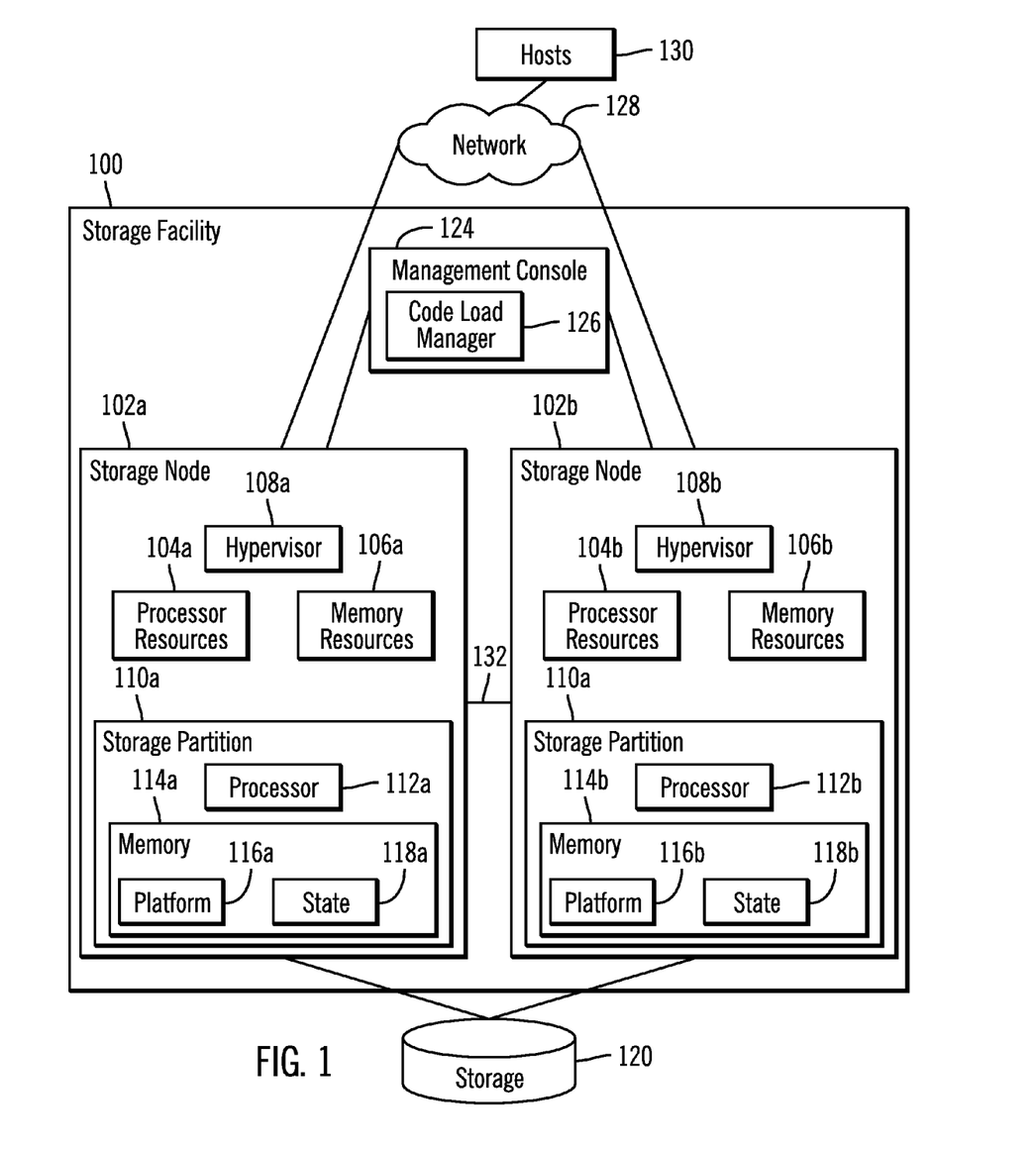
FIG. 1 illustrates an embodiment of a storage environment.

FIG. 1 illustrates a storage environment having a storage facility 100 having two storage nodes 102a, 102b, where each storage node 102a, 102b includes processor resources 104a, 104b, comprising one or more processor devices, memory resources 106a, 106b, and a hypervisor 108a, 108b to assign processor resources 104a, 104b, memory resources 106a, 106b, and other hardware (e.g., storage and network) resources to logical partitions. The storage nodes 102a, 102b each include at least one logical partition shown as a storage partition 110a, 110b created by the respective hypervisor 108a, 108b. Each storage partition 110a, 110b includes allocated processor resources 112a, 112b, memory 114a, 114 resources, and other resources, such as network adaptor, storage adaptor and other device resources implemented in hardware at the storage nodes 102a, 102b. In this way, the storage node 102a, 102b resources can be divided into multiple partitions 110a, 110b, where each partition and its owned resources can perform application tasks independent of the other partitions in the storage node 102a, 102b.

A partition 110a, 110b profile records how much and which resources 104a, 104b, 106a, 106b, such as processor, memory, adaptor, storage, etc., are dedicated to each logical partition and its applications. Resource quantities are bounded by the maximum and minimum partition profile settings. Within such boundaries, the hypervisors 108a, 108b may dynamically assign resources, such as add, move or remove resources at the partitions 110a, 110b without deactivating the partition.

The storage partition 110a, 110b may implement a platform 116a, 116b, comprising an operating system and other application programs and firmware implemented in the partition memory 114a, 114b or in hardware allocated to the partition. In implementations where the storage partitions 110a, 110b comprise storage partitions, the platform 116a, 116b may include storage manager code to manage storage operations. The memory 114a, 114b further includes system, device, and other state information 118a, 118b on an operational state of the partitions 110a, 110b.

In one embodiment, the partitions 110a, 110b comprise virtual storage partitions to provide redundant access to a coupled storage 120. The storage partitions 110a, 110b may be implemented in different storage nodes 102a, 102b, i.e., different computer hardware, to provide redundant access to the storage 120 to provide availability if one failed. The storage nodes 102a, 102b may have independent hardware and power sources to provide greater redundancy.

In implementations where the logical partition 110a, 110b comprises a storage partition, i.e., a logical storage subsystem, the state information 118a, 118b may include storage subsystem kernel processes, device data structure, user processes, and interrupts, storage subsystem managed cache contents, storage device adapter communication states, data transfer states with the source partition, storage host or channel adapter communication state, data transfer states with the source partition. Additional platform state 116a, 116b information may include processor state (register and cache contents), the partition 110a, 110b memory content and virtual memory page table, virtual adapter states for storage devices and networking devices, and partition configuration in the memory 114a, 114b.

The storage facility 100 may include a management console 124 coupled to the storage nodes 102a, 102b which includes a code load manager 126 to manage the updating of platform code 116a, 116b, such as software and firmware, at the storage nodes 102a, 102b. In further embodiments, the management console 124 may be external to the storage facility 100 and communicate with the storage nodes 102a, 102b over network 128. In still further embodiments, the code load manager 126 may be implemented on the storage nodes 110a, 110b to manage the updating of the platform code 116a, 116b in the storage partitions 110a, 110b.

The storage nodes 102a, 102b of the storage facility 100 are coupled to a network 128 through which hosts 130 coupled to the network 128 may send Input/Output (I/O) requests to the storage nodes 102a, 102b for the storage 120.

The storage nodes 102a, 102b may communicate over a communication link 132, such as a cable, bus, etc., to coordinate failover and fail back operations in the event one of the storage nodes 102a, 102b fails.

The network 128 may comprise a Storage Area Network (SAN), Wide Area Network (WAN), Local Area Network (LAN), the Internet, and Intranet, a wireless network, wired network, etc.

The storage 120 may comprise different types or classes of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage 120 may further be configured from an array of devices, such as Just a Bunch of Disks (JBOD), Direct Access Storage Device (DASD), Redundant Array of Independent Disks (RAID) array, virtualization device, etc. Further, the storage 120 may comprise heterogeneous storage devices from different vendors.

The memory resources 106a, 106b from which the partition memory 114a, 114b is allocated may comprise one or more volatile or non-volatile memory devices. The platform code 116a, 116b and state information 118a, 118b may be implemented as a program code loaded into the memory and executed by the processor resources 104a, 104b or may be implemented with hardware logic, such as an Application Specific Integrated Circuit (ASIC).

Figure 2:
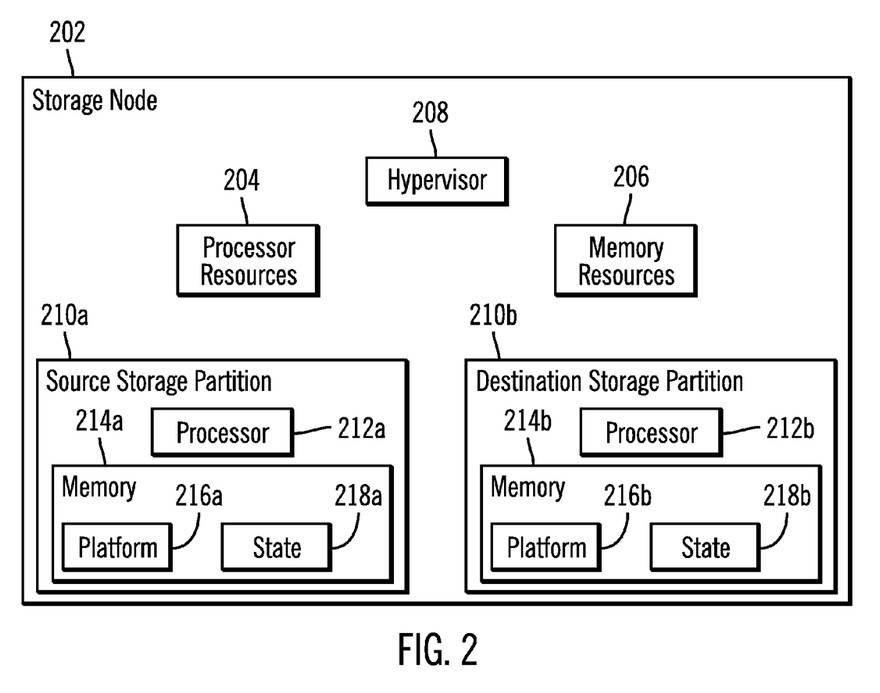
FIG. 2 illustrates an embodiment of a storage node.

FIG. 2 illustrates an embodiment of how a source storage partition 210a, such as one of the partitions 110a, 110b, in a storage node 202, comprising one of storage nodes 102a, 102b, is replicated in a destination storage partition 210b for the purpose of applying a new code load to the destination storage partition 210b to upgrade the platform code 216a to a new or desired version of the platform code 216b. As part of updating the platform code 216b in the destination storage partition 210b, the operational state 218a information in the source storage partition 210a is migrated to the state information 218b in the destination storage partition 210b. In this way, the platform code load is applied to a replicated destination storage partition 210b without having to interfere with I/O operations handled by the source storage partition 210a so that both storage partitions 110a, 110b remain online as long as possible to provide redundancy and minimize the amount of time that transactions are halted to complete a platform code lode upgrade.

Figure 3A:
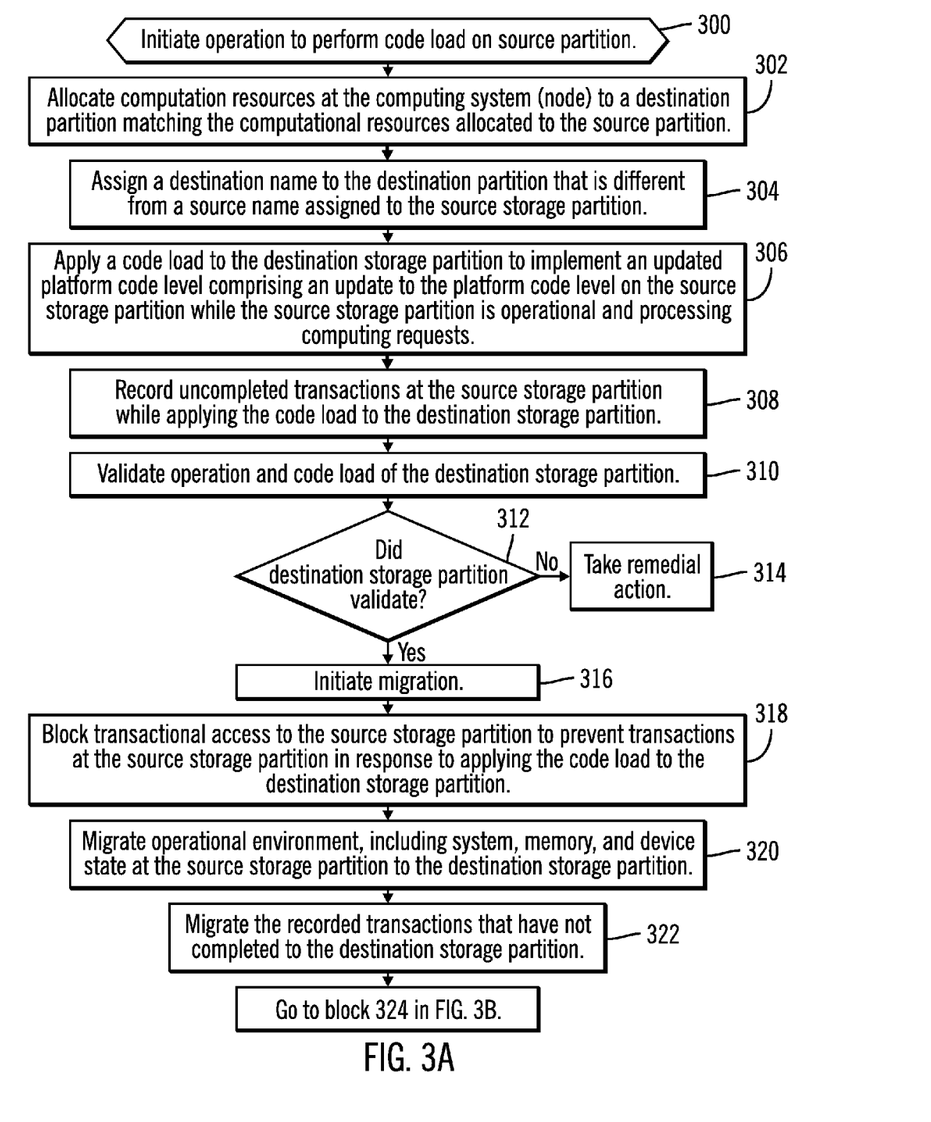
FIGS. 3a and 3b illustrate an embodiment of operations to update the platform code at a storage partition in the storage nodes.
Figure 3B:
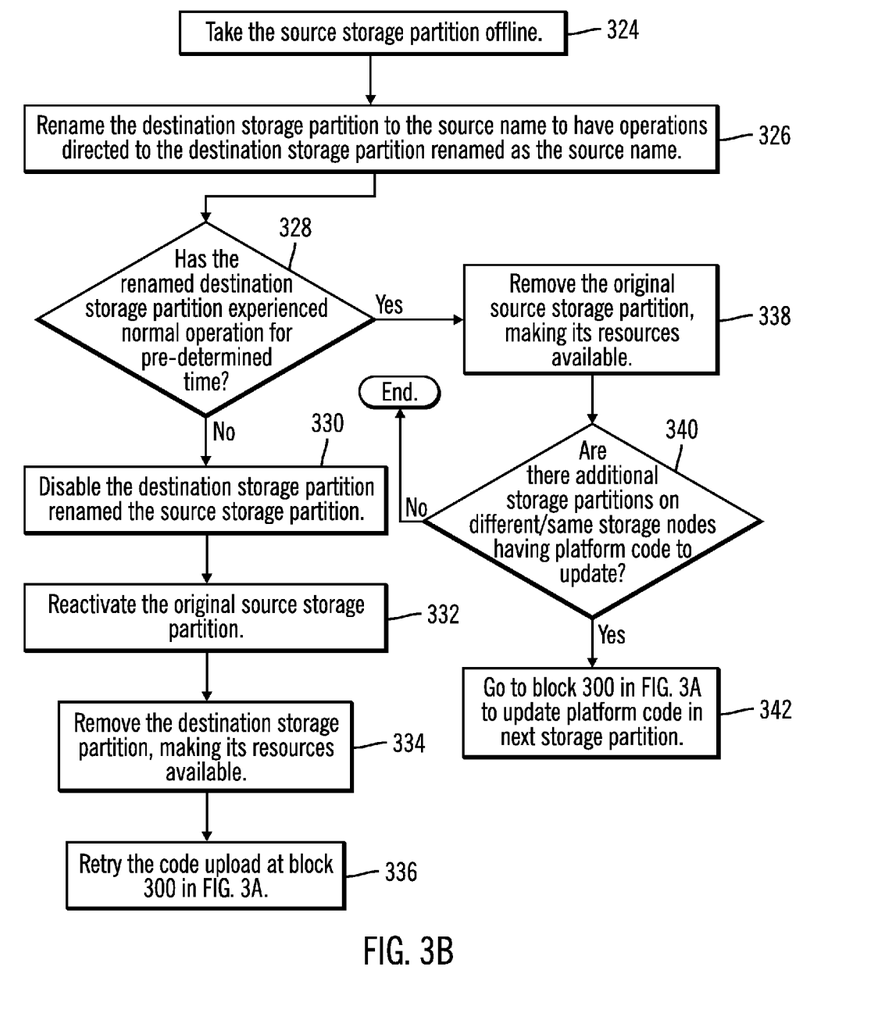

FIGS. 3a and 3b illustrate an embodiment of operations performed by the code load manager 126 to update the platform code 116a, 116b at the storage partitions 110a, 110b. Upon initiating an operation to perform a code lode at the storage partition 110a, 110b in one of the storage nodes 102a, 102, or update the source partition 210a, the code load manager 126 invokes the hypervisor 208 in the storage node 102a, 102b being updated, to create a destination storage partition 210b from the processor 204 and memory 206 resources of the storage node 202, e.g., 102a, 102b. The destination storage partition 210b resources can either be assigned from unused resources 204, 206 or come from a portion of the operational subsystem, i.e., the storage node 202 system. In certain embodiments, the source 210a and destination 210b partitions may have the same amount of resources 204, 206, so that newly created destination storage partition 210b has the same characteristic, functionality and performance as the source storage partition 210a to which the platform code update is applied.

The code load manager 126 assigns (at block 304) a destination name to the destination partition that is different from a source name assigned to the source partition so the destination storage partitions 210b is distinguished from the source 210a and does not interfere with the active source storage partition 210a handling of I/O operations for the storage 120. The code load manager 126 applies (at block 306) a code load to the destination storage partition 210b to implement an updated platform 216b code level comprising an update to the platform 216a code level on the source partition 210a while the source partition 210a is operational and processing transactions from hosts 130. The updated code load 216b may include a desired level of operating system code, customized storage system functional code and other application software. While applying the code load, uncompleted transactions at the source storage partition 210a are recorded (at block 308).

The code load manager 126 validates (at block 310) the code load to the destination storage partition 210b. If (at block 312) the destination partition 210b platform code 216b did not validate, then remedial action is taken (at block 314), such as restarting the effort to create a destination storage partition 210b. If the destination partition 210b code load is validated (from the yes branch of block 312), then migration is initiated (at block 316). To initiate migration, the code load manager 126 performs an operation to block (at block 318) new transactions from being processed at the storage partition 210a during migration. I/O transactions may be quiesced at the hosts 130. In one embodiment, transactions are blocked at the source storage partitions 210a during migration by setting a service lock for the source storage partition 210a.

The code load manager 126 migrates (at block 320) the operational environment at the source storage partition 210a to the destination storage partition 210b, by migrating all the system, memory and device state 218a operational environment to the destination storage partition 210ab to be stored in the destination state 218b information. Recorded transactions that did not complete at the source storage partition 210a are also migrated (at block 322) to the destination partition 210b to complete.

Control then proceeds to block 324 in FIG. 3b to take the source storage partition 210a offline and rename (at block 326) the destination storage partition 210b to the source name so that host operations are directed to the destination storage partition 210b renamed as the source name. If (at block 328) the renamed destination storage partition 210b does not experience normal operations functioning as the active storage partition for a predetermined time, such as failing before the predetermined time has completed, then the code load manager 126 disables (at block 330) the destination storage partition 210b acting as the active storage partition and reactivates (at block 332) the original source storage partition 210a to provide redundancy in the storage facility 100. The destination storage partition 210b is then removed (at block 334) to make the allocated resources 204, 206 available for reuse in another logical partition. The code load manager 126 may retry (at block 336) the code upload for the source storage partition 210a by returning to block 300 in FIG. 3a.

If (at block 328) the destination storage partition 210b renamed the source name has been operating normally as the active storage partition for the predetermined time, then the code load manager 126 removes (at block 338) the original source storage partition 210a to make its resources 204, 206 available for reuse. If (at block 340) there are additional storage partitions on the same or different storage node 102a, 102b that have to have their platform code updated, then control proceeds (at block 342) to block 300 in FIG. 3a to update the platform code in a next storage partition.

With described embodiments, the time redundant storage partitions are available is maximized because during the code load to the destination storage partition 210b, the source storage partition 210a remains active. Further, the source 210a and destination 210b partitions names are temporarily different before the migration completes in order to distinguish the source 210a from the destination 210b partitions. When migration completes successfully and the source partition is shutdown, the destination partition can be renamed to the source partition, so that the rest of the system is not impacted or no reference change is required. During the period of the migration, a service lock can be set to prevent partition reference until the transition is ready.

With described embodiments, the time during which redundancy is unavailable is minimized because the time to migrate the system state and transactions takes a short period of time, in the scale of seconds. The external running production applications on hosts 130 do not encounter a storage facility 100 performance impact because the storage partitions 110a, 110b operations were not disrupted, except for the brief time during the state migration. Total storage facility 100 redundancy level is not reduced. Furthermore, the risk of code update failure does not impact storage subsystem operation, because the existing storage partition can remain operational until the migration is completed and the new storage partition with the updated code level is verified operational. At that point, the original source partition/subsystem with the old code level can be shut down and the original source partition resources can be reused for creating the new subsystem for the next subsystem migration.

In described embodiments, the destination storage partition is located on the same storage node as the source storage partition 210a. In alternative embodiments, the destination storage partition 210b may be on a different storage node.

In described embodiments, the code load was described with respect to the platform code in a storage partition providing storage subsystem services for a network storage accessed by hosts 130 over a network 128. In alternative embodiments, the partitions 210a being updated with a code load may comprise a logical (virtual) or physical partition used for purposes other than as a storage partition. For instance, the partition 210a to have the platform code load update may be part of one or more partitions providing access to computational resources and services other than storage resources, such as database services, web services, application services, communication services, etc. Further, with described embodiments, the source and destination partitions are not shutdown or deactivated during the migration process, i.e., shutdown the operating system and partition. Only after the migration to the destination partition has completed is the source partition deactivated and taken offline.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 4:
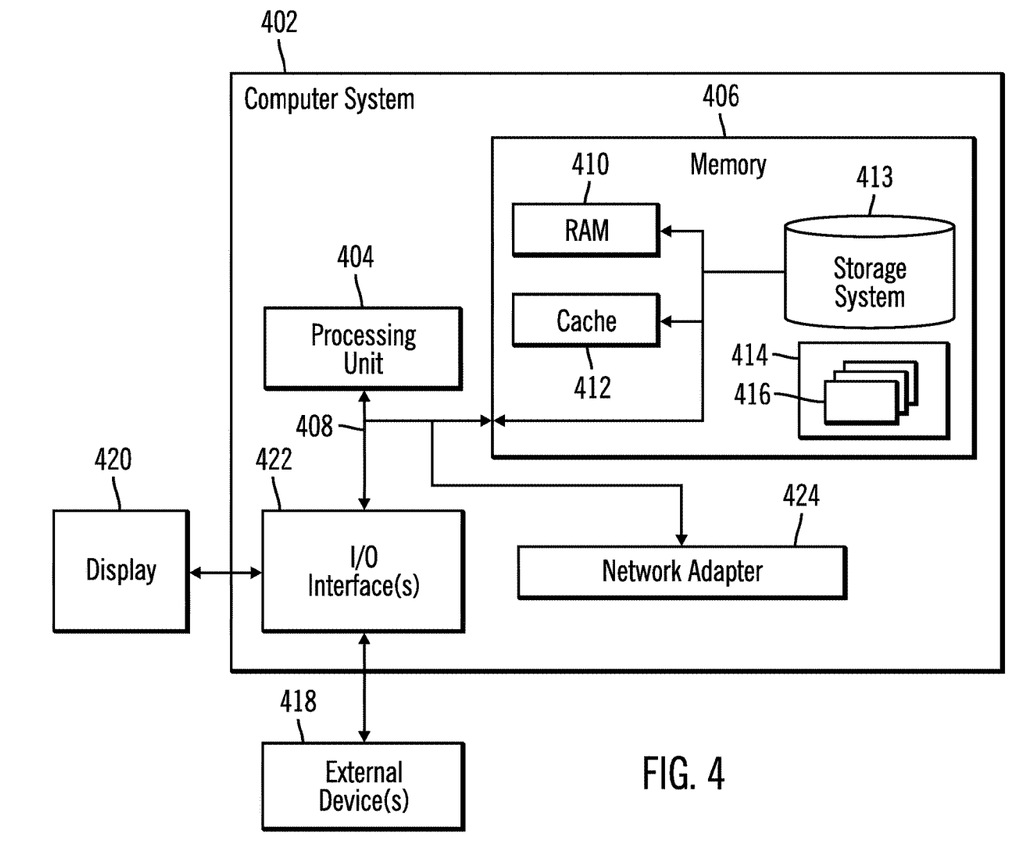
FIG. 4 illustrates an embodiment of a computer architecture used with described embodiments.

The storage nodes 102*a*, 102*b*, 202, management console 124, and host 130, and components therein, may be implemented in one or more computer systems, such as the computer system 402 shown in FIG. 4. If the components of the network computing environment of FIG. 1 are implemented in multiple systems, then the systems may communicate over the network 4. Computer system/server 402 may be described in the general context of computer system executable instructions, such as program modules, being executed by a computer system. Generally, program modules may include routines, programs, objects, components, logic, data structures, and so on that perform particular resources or implement particular abstract data types. Computer system/server 402 may be practiced in distributed cloud computing environments where resources are performed by remote processing devices that are linked through a communications network. In a distributed cloud computing environment, program modules may be located in both local and remote computer system storage media including memory storage devices.

As shown in FIG. 4, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 416 which generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 12; and/or any devices (e.g., network card, modem, etc.) that enable computer system/server 402 to communicate with one or more other computing devices. Such communication can occur via Input/output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing a code load update to update a source partition in a computing system, wherein the source partition implements a platform code level, the computer program product comprising a non-transitory computer readable storage medium having computer readable program code embodied therein that is executable to perform operations, the operations comprising:
    allocating computational resources in the computing system to a destination partition;
    applying a code load to the destination partition comprising an updated platform code level for the source partition while the source partition is operational and processing computing requests, wherein the destination partition operates with the updated platform code level as an active storage partition;
    blocking submission of new transactions to the source partition in response to applying the code load to the destination partition;
    migrating an operational environment at the source partition comprising system, memory and device state at the source partition to the destination partition in response to blocking submission of new transactions to the source partition; and
    directing transactions to the destination partition intended for the source partition in response to migrating the operational environment to the destination partition.

2. The computer program product of claim 1, wherein the source partition and the destination partition comprise logical partitions implemented in the computing system.

3. The computer program product of claim 2, wherein the computational resources allocated to the destination partition match the computational resources allocated to the source partition.

4. The computer program product of claim 1, wherein the computing system comprises a storage node managing Input/Output (I/O) transactions from host systems to a coupled storage, and wherein the source partition comprises a source storage partition implementing one of a plurality of storage subsystems providing redundant storage subsystem services for a storage facility.

5. The computer program product of claim 1, wherein the operations further comprise:

assigning a destination name to the destination partition that is different from a source name assigned to the source partition;
renaming the destination partition to the source name to have operations directed to the destination partition renamed as the source name; and
removing the source partition in response to the destination partition being determined operational.

6. The computer program product of claim 1, wherein the operations further comprise:
recording transactions at the source partition while applying the code load to the destination partition, wherein migrating the operational environment to the destination partition further comprises migrating the recorded transactions that have not completed to the destination partition.

7. The computer program product of claim 6, wherein the operations further comprise:
validating the migration of the operational environment, including system, memory and device state information to the destination partition, wherein the transactions are migrated to the destination partition in response to the validating the migration of the system, memory and device state information to the destination partition.

8. The computer program product of claim 1, wherein the computing system comprises a first computing system, the source partition comprises a first source partition and the destination partition comprises a first destination partition, wherein the operations further comprise:
allocating computational resources in a second computing system to a second destination partition;
applying a code load to the second destination partition to implement the updated platform code level on a second source partition while the first source partition is operational and processing transactions, wherein the first and second source partitions provide redundant access to a computer related service;
blocking submission of new transactions to the second source partition in response to applying the code load to the second destination partition;
migrating an operational environment at the second source partition to the second destination partition in response to blocking submission of new transactions to the second source partition; and
directing operations to the second destination partition intended for the second source partition in response to migrating the operational environment to the second destination partition.

9. A system for performing a code load update to update a source partition in a computing system, wherein the source partition implements a platform code level, comprising:
a processor;
a computer readable storage medium having program code executed by the processor to perform operations, the operations comprising:
allocating computational resources in the computing system to a destination partition;
applying a code load to the destination partition comprising an updated platform code level for the source partition while the source partition is operational and processing computing requests, wherein the destination partition operates with the updated platform code level as an active storage partition;
blocking submission of new transactions to the source partition in response to applying the code load to the destination partition;
migrating an operational environment at the source partition comprising system, memory and device state at the source partition to the destination partition in response to blocking submission of new transactions to the source partition; and
directing transactions to the destination partition intended for the source partition in response to migrating the operational environment to the destination partition.

10. The system of claim 9, wherein the computational resources allocated to the destination partition match the computational resources allocated to the source partition.

11. The system of claim 9, wherein the computing system comprises a storage node managing Input/Output (I/O) transactions from host systems to a coupled storage, and wherein the source partition comprises a source storage partition implementing one of a plurality of storage subsystems providing redundant storage subsystem services for a storage facility.

12. The system of claim 9, wherein the operations further comprise:
assigning a destination name to the destination partition that is different from a source name assigned to the source partition;
renaming the destination partition to the source name to have operations directed to the destination partition renamed as the source name; and
removing the source partition in response to the destination partition being determined operational.

13. The system of claim 9, wherein the operations further comprise:
recording transactions at the source partition while applying the code load to the destination partition, wherein the migrating the operational environment to the destination partition further comprises migrating the recorded transactions that have not completed to the destination partition.

14. The system of claim 13, wherein the operations further comprise:
validating the migration of the operational environment, including system, memory and device state information to the destination partition, wherein the transactions are migrated to the destination partition in response to the validating the migration of the system, memory and device state information to the destination partition.

15. A computer implemented method for performing a code load update to update a source partition in a computing system, wherein the source partition implements a platform code level, comprising:
allocating computational resources in the computing system to a destination partition;
applying a code load to the destination partition comprising an updated platform code level on the source partition while the source partition is operational and processing computing requests, wherein the destination partition operates with the updated platform code level as an active storage partition;
blocking submission of new transactions to the source partition in response to applying the code load to the destination partition;
migrating an operational environment at the source partition comprising system, memory and device state at the source partition to the destination partition in response to blocking submission of new transactions to the source partition; and directing transactions to the destination partition intended for the source partition in response to migrating the operational environment to the destination partition.

16. The method of claim 15, wherein the computational resources allocated to the destination partition match the computational resources allocated to the source partition.

17. The method of claim 15, wherein the computing system comprises a storage node managing Input/Output (I/O) transactions from host systems to a coupled storage, and wherein the source partition comprises a source storage partition implementing one of a plurality of storage subsystems providing redundant storage subsystem services for a storage facility.

18. The method of claim 15, further comprising:
assigning a destination name to the destination partition that is different from a source name assigned to the source partition;
renaming the destination partition to the source name to have operations directed to the destination partition renamed as the source name; and
removing the source partition in response to the destination partition being determined operational.

19. The method of claim 15, further comprising:
recording transactions at the source partition while applying the code load to the destination partition, wherein the migrating the operational environment to the destination partition further comprises migrating the recorded transactions that have not completed to the destination partition.

20. The method of claim 19, further comprising:
validating the migration of the operational environment, including system, memory and device state information to the destination partition, wherein the transactions are migrated to the destination partition in response to the validating the migration of the system, memory and device state information to the destination partition.

* * * * *